(12) United States Patent
Tylutki et al.

(10) Patent No.: US 8,108,857 B2
(45) Date of Patent: Jan. 31, 2012

(54) COMPUTER PROGRAM PRODUCT AND METHOD FOR CAPACITY SIZING VIRTUALIZED ENVIRONMENTS

(75) Inventors: Marcus A. Tylutki, Morgan Hill, CA (US); Noshir C. Wadia, Morgan Hill, CA (US); Qi He, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1189 days.

(21) Appl. No.: 11/846,643

(22) Filed: Aug. 29, 2007

(65) Prior Publication Data

US 2009/0064156 A1  Mar. 5, 2009

(51) Int. Cl.
*G06F 9/46* (2006.01)
*G06F 9/455* (2006.01)

(52) U.S. Cl. ............................................ 718/1; 718/104
(58) Field of Classification Search .................. None
See application file for complete search history.

(56) References Cited

U.S. PATENT DOCUMENTS

| | | | | |
|---|---|---|---|---|
| 6,223,202 | B1 * | 4/2001 | Bayeh | 718/102 |
| 6,910,061 | B2 | 6/2005 | Hu et al. | 709/202 |
| 7,159,184 | B2 | 1/2007 | Ullah et al. | 715/762 |
| 7,398,191 | B1 * | 7/2008 | Gluhovsky et al. | 703/2 |
| 7,818,145 | B2 * | 10/2010 | Wood et al. | 702/179 |
| 2005/0108712 | A1 | 5/2005 | Goyal | 718/100 |
| 2005/0203940 | A1 | 9/2005 | Farrar et al. | 707/102 |
| 2005/0278453 | A1 | 12/2005 | Cherkasova | 709/231 |
| 2006/0090163 | A1 | 6/2006 | Karisson et al. | 718/105 |
| 2006/0253472 | A1 | 11/2006 | Wasserman et al. | 707/100 |
| 2006/0265470 | A1 | 11/2006 | Rolia et al. | 709/217 |
| 2006/0277155 | A1 | 12/2006 | Bell et al. | 707/2 |
| 2006/0277549 | A1 | 12/2006 | Li et al. | 718/104 |
| 2007/0078988 | A1 * | 4/2007 | Miloushev et al. | 709/227 |
| 2007/0271560 | A1 * | 11/2007 | Wahlert et al. | 718/1 |
| 2008/0028409 | A1 * | 1/2008 | Cherkasova et al. | 718/104 |
| 2008/0134191 | A1 * | 6/2008 | Warrier et al. | 718/104 |

OTHER PUBLICATIONS

Rolia, J.; Cherkasova, L.; McCarthy, C.; "Configuring Workload Manager Control Parameters for Resource Pools".
Rolia, J.; Cherkasova, L.; "A Capacity Management Service for Resource Pools", Jan. 4, 2005.
Andrzejak, A., "Bounding the Resource Savings of Utility Computing Models", Dec. 6, 2002.

* cited by examiner

*Primary Examiner* — Kenneth Tang
(74) *Attorney, Agent, or Firm* — Kunzler Needham Massey & Thorpe

(57) ABSTRACT

A computer system determines an optimal hardware system environment for a given set of workloads by allocating functionality from each workload to logical partitions, where each logical partition includes resource demands, assigning a priority weight factor to each resource demand, configuring potential hardware system environments, where each potential hardware system environment provides resource capacities, and computing a weighted sum of least squares metric for each potential hardware system environment.

15 Claims, 5 Drawing Sheets

COMPUTER PROGRAM PRODUCT AND METHOD FOR CAPACITY SIZING VIRTUALIZED ENVIRONMENTS

BACKGROUND OF THE INVENTION

1. Field of the Invention

This invention relates to computer resource planning systems and more particularly relates to capacity planning for virtualized environments.

2. Description of the Related Art

Capacity sizing for virtualized environments is currently very limited in scope. Attempts in the present art show the results of a given virtualized environment and configuration and are incapable of providing recommendations of consolidating multiple workloads into a single virtualized environment.

The present art is limited to predicting performance of a single workload on a virtualized instance of an environment. The present art is at best, a poor predictor of behavior for multiple virtualized environments sharing a common distributed resource pool.

Due to introduction of virtualized environments and shared workspaces, and the continued desire to determine the optimal hardware configuration, there is a long felt need for a computer program product and method to accurately predict the hardware environment required to support a virtualized environment that is required to support a specified functionality.

SUMMARY OF THE INVENTION

From the foregoing discussion, it should be apparent that a need exists for a computer program product and method that accurately determines the optimal hardware configuration required to support a virtualized environment that is turn required to support a defined functionality set. Beneficially, such a computer program product and method would optimize a minimum hardware configuration required to support the defined functionality.

This invention provides a process of taking a given set of workloads (along with their characteristics and individual performance objectives), and provides a configuration solution, which takes into account additional configuration specifications, such as a list of available systems and corresponding operating systems. This provides a solution that can accurately size multiple virtualized workloads in a single system or environment, as opposed to individually sizing multiple workloads for the same environment or for a virtualized environment.

The present invention introduces a computer program product and method to determine the optimal hardware configuration. Advantageously, this permits the support of a defined functionality with a minimum amount of hardware. The present invention deals specifically with using a weighted sum-of-least-squares optimization technique where the optimality of the solution is a function of resource utilization and weights that are set according to the priority of the associated resource.

Accordingly, the present invention has been developed to provide a capacity sizing computer program product for a virtualized environment that overcome many or all of the above-discussed shortcomings in the art.

The computer system of the present invention is provided with a memory that includes a functional specification, at least one processor configured to execute a plurality of threads, and program code configured to be executed by the at least one processor.

In one embodiment, a computer system is adapted to determine an optimal so hardware system environment for a given set of workloads, where this computer system comprises a memory within which is resident a specification which defines the functionality of each workload and a plurality of resource demands for each workload, at least one processor configured to execute a plurality of threads; and program code configured to be executed by the at least one processor.

The program code first operates to allocate functionality from each workload to certain logical partitions within a group of logical partitions, where each logical partition includes a plurality of resource demands derived from the particular workload from which it was allocated. The program code next operates to configure a first potential hardware system environment comprising a group of hardware components selected from a predefined pool of hardware components, where each hardwire component is able to provide a plurality of resource capacities, and the overall first potential hardware system environment is able to provide specific resource capacities that exceed the specific resource demands of the given set of workloads.

The program code next operates to partition the first potential hardware system environment into a plurality of virtual machine nodes where each of the virtual machine nodes corresponds to one of the logical partitions. The program code next operates to assign a plurality of priority weight factors, where each priority weight factor is assigned to a specific resource demand of a specific logical partition. The program code next operates to compute a weighted sum of least squares metric for the first potential hardware system environment, where each addend comprising the sum is computed from a specific resource demand of a specific logical partition, the specific resource capacity of the corresponding virtual machine, and the individual priority weight factor assigned to the specific resource demand of the specific logical partition.

The program code next operates to configure additional potential hardware system environments by selecting hardware components selected from the predefined pool of hardware components. The program code next operates to partition each of the additional potential hardware system environments into a corresponding plurality of virtual machines. The program code next operates to compute additional weighted sum of least squares metrics, where each additional metric corresponds to one resource of the additional potential hardware system environments. The program code finally operates to determine an optimal hardware system environment based on a weighted sum of least squares metric for the first potential hardware system environment and the additional weighted sum of least squares metrics.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. Modules produce a useable result that may be an end-product or an intermediate result passed on to a subsequent module. An identified module of executable code may, for instance, comprise one or more physical or logical blocks of computer instructions which may, for instance, be organized as an object, procedure, or function. Nevertheless, the executable implementations of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Modules may be defined in software source code in the form of scripts, sets of software libraries, source code files defining software objects, and the like. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

One skilled in the relevant art will recognize, however, that the invention may be practiced without one or more of the specific details, or with other methods, components, materials, and so forth.

According to the present invention, multiple workloads are executed on a common virtualized environment which in turn runs on a defined set of hardware.

Figure 1:
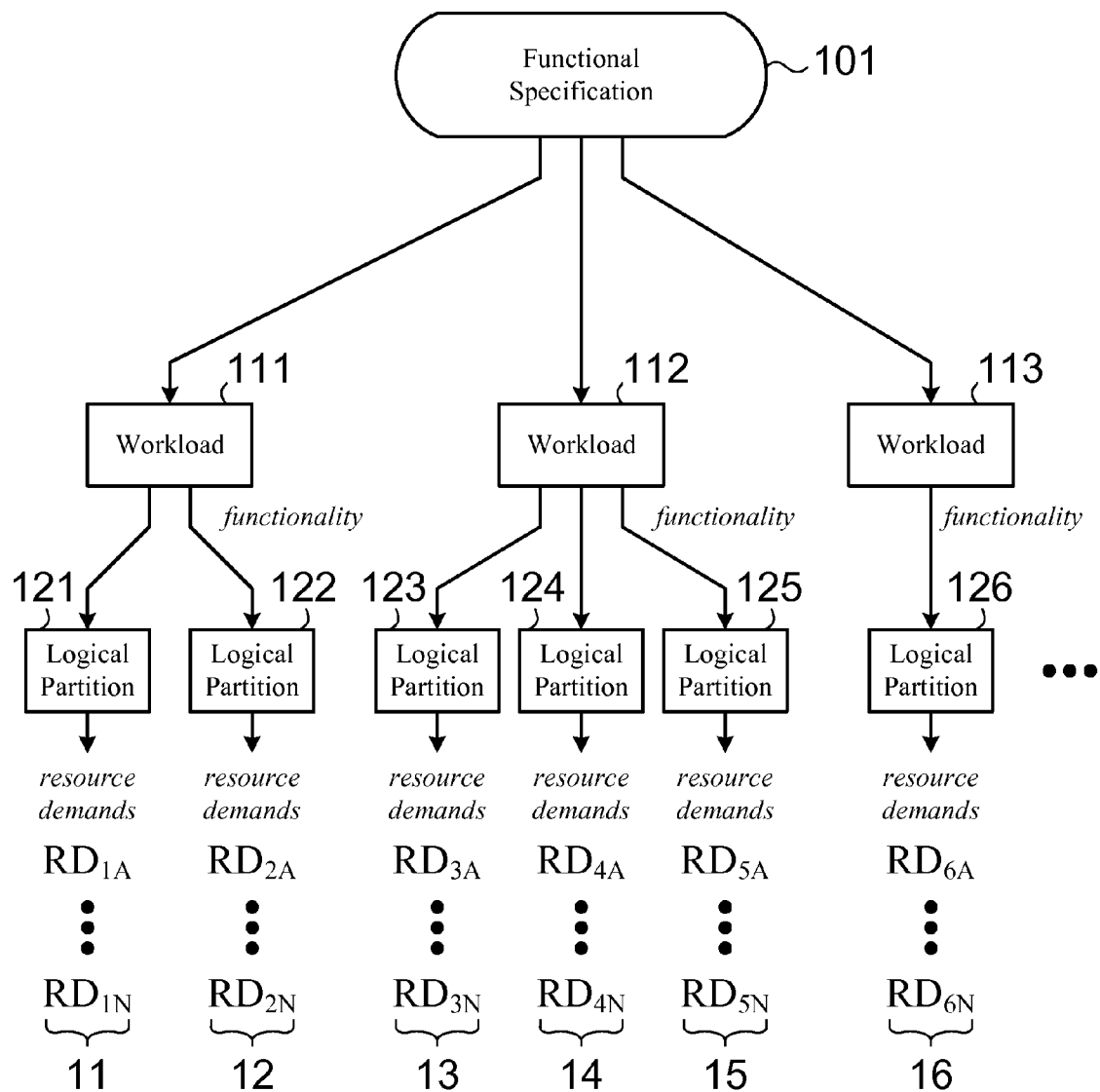
FIG. 1 schematically depicts the functional allocation of a predefined set of workloads in accordance with one illustrative embodiment of the present invention.

Refer now to FIG. 1. The user requesting a sizing first defines a functional specification 101 for the environment. Each workload 111, 112, and 113 can normally be represented from a standard set of functional tiers. For example, a common web-based workload may include a Web server tier, an Application tier, and a Database tier, where these functional tiers can be combined to form a one (1), two (2), or three (3) tier topology within one, two, or three logical partitions.

The functionality of the tiers within each workload 111, 112, and 113 are allotted to logical partitions. For the embodiment illustrated in FIG. 1, the functionality of the first workload 111 is allocated to two logical partitions 121 and 122, the functionality of the second workload 112 is allocated to three logical partitions 123, 124, and 125, and the functionality of the third workload 113 is allocated to one logical partition 126. For example, a valid functional allotment may be to combine the Web server tier and Application tier into one logical partition, while keeping the Database tier in a separate logical partition.

Functional logical partition definitions are dynamic and are dynamically derived from the associated workload's requirements and the functional specification 101. The present invention does not rely on a static map of workloads to logical partitions. Logical partitions have certain components that are dependent on demand and other components that are independent of demand. This means that although each logical partition has overall performance requirements, these performance requirements do not classify or define which logical partition is associated with a given workload.

Once each workload 111, 112, and 113 in the environment is functionally allotted, the resource demands for each logical partition are determined by that logical partition's particular workload and its resource demands, based on the functional tiers within that workload. These resource demands can be CPU demands, Memory demands, Bandwidth demands, I/O demands, or other resource demands. For the embodiment illustrated in FIG. 1, the first logical partition 121 has a first set of resource demands 11 and the second logical partition 122 has a second set of resource demands 12, where these resource demands are derived from the first workload 111. Similarly, the third, fourth, and fifth set of resource demand 13, 14, and 15 are derived from the second workload 112 and the sixth set of resource demands 16 is derived from the third workload 113.

Figure 2:
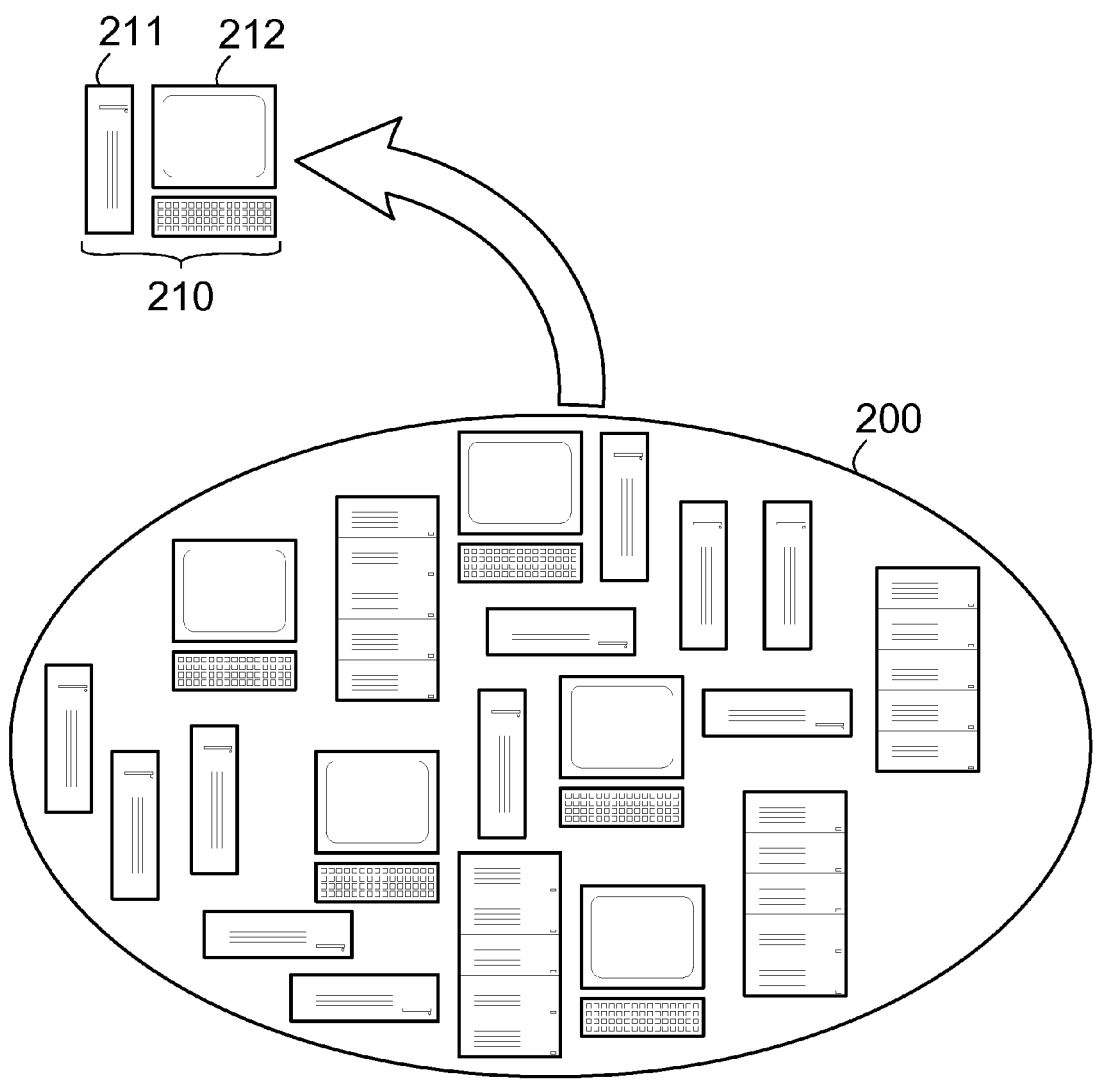
FIG. 2 depicts the selection of certain hardware elements from a predefined pool of hardware elements in accordance with the present invention.

Refer now to FIG. 2. A first potential hardware system environment 210 consists of a group of hardware components 211 and 212 which were selected from a predefined pool of hardware components 200. In preferred embodiments, the predefined pool of hardware components 200 includes variants of certain hardware models where each variant is based on a hardware brand and model, that specifies the range of possible CPU core configurations for that model, and the maximum memory available based on the number of cores.

Figure 3:
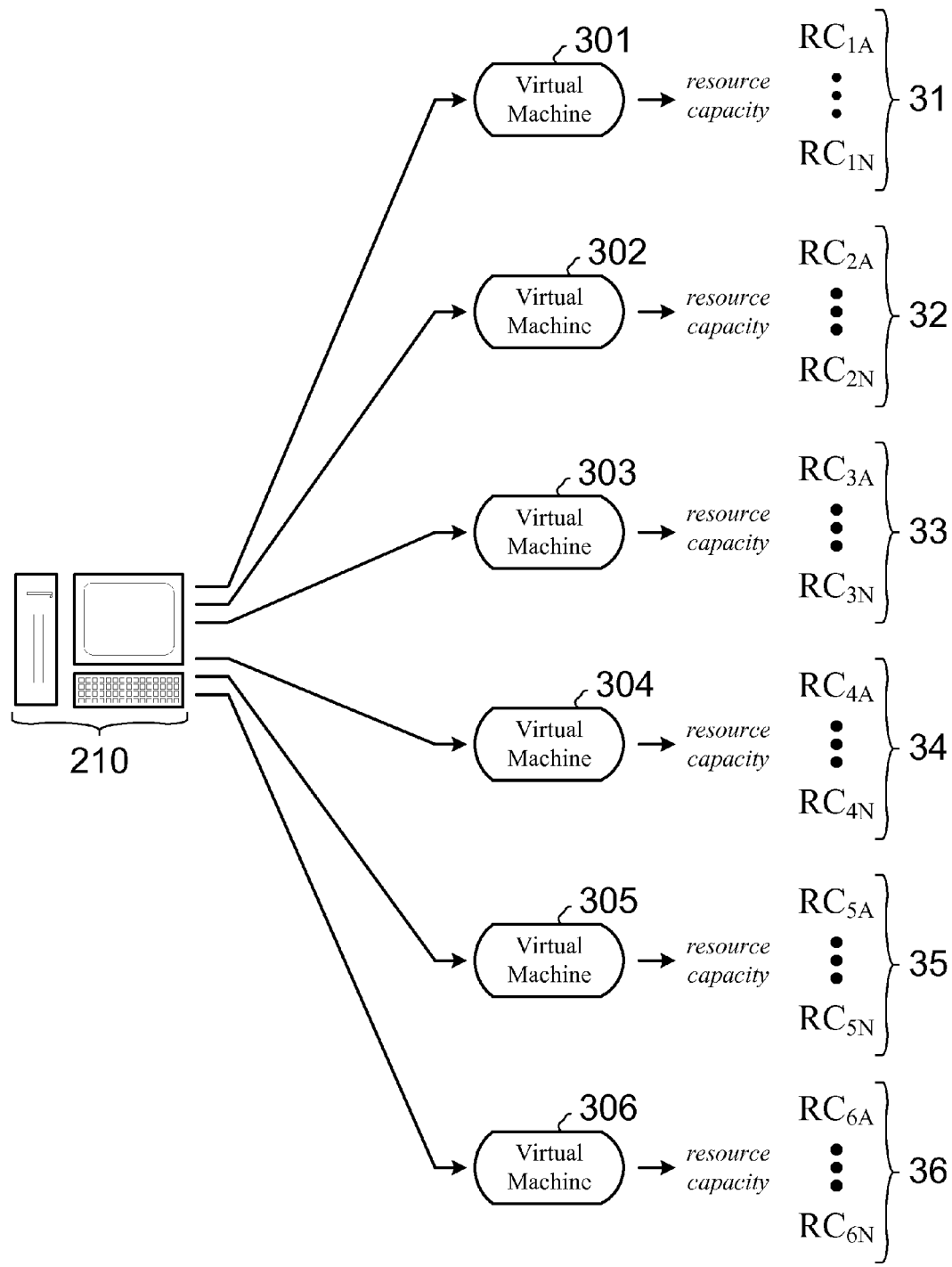
FIG. 3 depicts the partition of a hardware environment into a number of virtual machines, where each virtual machine satisfies a set of resource capacities, in accordance with one illustrative embodiment of the present invention.

Now, refer to FIG. 3. The first potential hardware system environment 210 is partitioned into a number of virtual machines 301, 302, 303, 304, 305, and 306, where each of these virtual machines corresponds to one of the logical partitions shown in FIG. 1. Now, as can be appreciated by those skilled in the art, each of the virtual machines 301, 302, 303, 304, 305, and 306 provide resource capabilities that can be used to achieve the desired system functionality. These resource capacities can be CPU capacities (e.g. 'processing power'), Memory capacities (e.g. 'storage space'), Bandwidth capacities (e.g. 'network throughput'), I/O capacities, or other resource capacities. It is important to note that the present invention is not a limited partitioning of a single system into multiple partitions (e.g. virtual machines), but instead can perform capacity sizing for heterogeneous environments on multiple different systems (i.e. equipment from multiple hardware vendors).

For the embodiment illustrated in FIG. 3, the first virtual machine 301 performs the functionality that has been allocated to the corresponding first logical partition 121, shown in FIG. 1, and provides resource capacities 31 corresponding to the resource demands 11 of the first logical partition 121. The second virtual machine 302 performs the functionality that has been allocated to the corresponding second logical partition 122, shown in FIG. 1, and provides resource capacities 32 corresponding to the resource demands 12 of the second logical partition 122. The third virtual machine 303 performs the functionality that has been allocated to the corresponding third logical partition 123, shown in FIG. 1, and provides resource capacities 33 corresponding to the resource demands 13 of the third logical partition 123. The fourth virtual machine 304 performs the functionality that has been allocated to the corresponding fourth logical partition 124, shown in FIG. 1, and provides resource capacities 34 corresponding to the resource demands 14 of the fourth logical partition 124. The fifth virtual machine 305 performs the functionality that has been allocated to the corresponding fifth logical partition 125, shown in FIG. 1, and provides resource capacities 35 corresponding to the resource demands 15 of the fifth logical partition 125. Finally, the sixth virtual machine 306 performs the functionality that has been allocated to the corresponding sixth logical partition 126, shown in FIG. 1, and provides resource capacities 36 corresponding to the resource demands 16 of the sixth logical partition 126.

Figure 4:
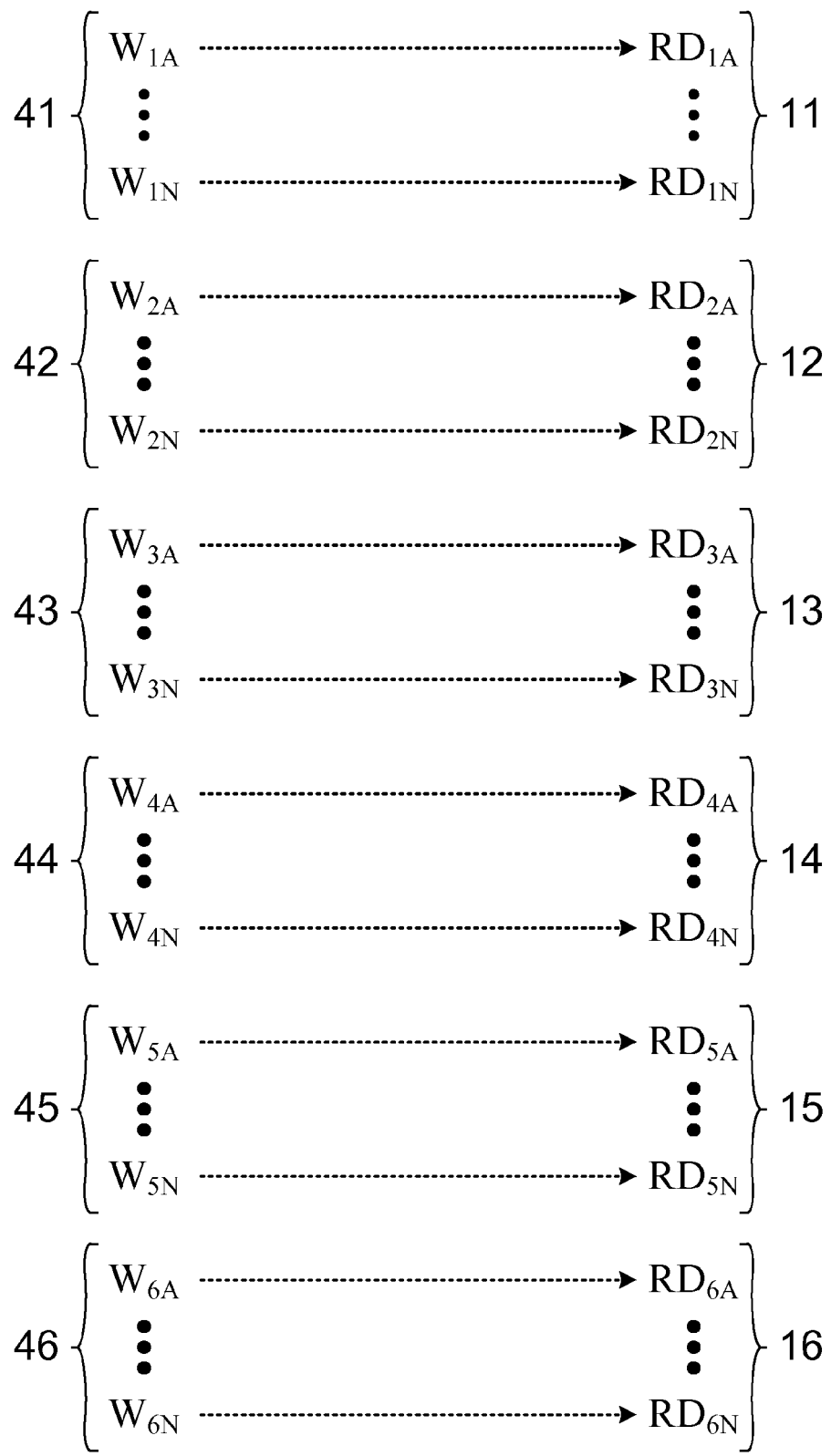
FIG. 4 shows a mapping of a predefined set of workloads to a corresponding set of resource demands in accordance with the present invention.

Refer now to FIG. 4. Each of the specific resource demands 11, 12, 13, 14, 15, and 16 are assigned priority weight factors 41, 42, 43, 44, 45, and 46. The overall problem of capacity planning for virtualized environments an now be represented as a city planning for virtualized Constraint Satisfaction Problem (CSP) with multiple constraints that must be satisfied when searching for an 'optimal' solution. One required constraint is the global priority of the resource demands. In our invention, this has now been reflected by assigned priority weight factors.

A weighted relative least squares metric, defined in Equation 1, is used to determine the optimal configuration. A first weighted relative least sum metric is computed for first potential hardware system environment 210, shown in FIG. 2.

$$S = \sum_{i \in R} w_i \left( \frac{y_i - f(x_i)}{y_i} \right)^2 \quad \text{Equation 1}$$

In Equation 1, each '$w_i$' is a priority weight factor (e.g. $W_{2A}$), each '$y_i$' is one of the specific resource capacities (e.g. $RC_{2A}$) and each '$f(x_i)$' is one of the specific resource demands (e.g. $RD_{2A}$). Each of the addends comprising the sum is computed from a specific resource demand of a specific logical partition, the specific resource capacity of the corresponding virtual machine, and the individual priority weight factor assigned to the specific resource demand of the specific logical partition.

Next, additional potential hardware system environments are configured by selecting hardware components from the predefined pool of hardware components 200, shown in FIG. 2. As before, each of these additional potential hardware system environments is partitioned into virtual machines, where each virtual machine corresponds to one of the logical partitions 121, 122, 123, 124, 125, and 126, as shown in FIG. 1. Weighted sum of squares metrics are computed for each of these additional potential system environments. The optimal hardware system environment is determined based on these metrics. For example, it may be desirable to have minimal excess of capacity versus demand.

Advantageously, the present invention allows weights to be assigned to resources other than the CPU. This means that a user can fine tune the priority weighting factors to emphasis any particular system resource, such as for example, network bandwidth.

A further embodiment of this capacity sizing computer program product includes an online hardware catalog that can be updated in real-time by any participating hardware vendor. Advantageously, this allows computer hardware vendors to characterize their equipment by listing a standard set of resource capacities for each hardware component.

Figure 5:
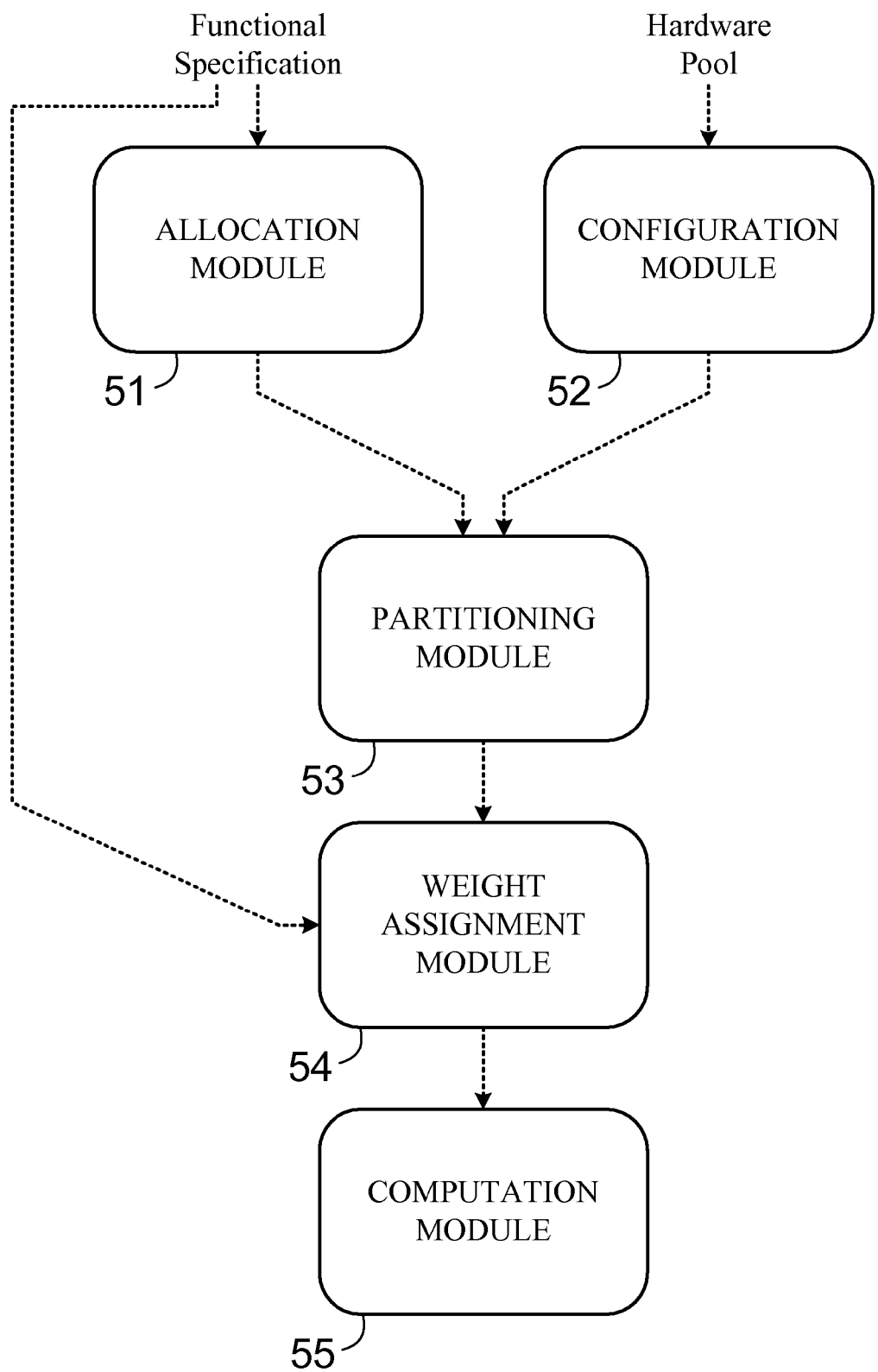
FIG. 5 depicts a set of functional modules configured to perform certain computational operations in accordance with one illustrative embodiment of the present invention.

The processes described above are advantageously performed by program code on a computer system adapted for the purpose of determining an optimal hardware system environment for a given set of workloads. Referring to FIG. 5 and recalling the above definition of a 'module'. The operation of allocating from each workload to certain logical partitions is performed by the allocation module 51. The operation of configuring the various potential hardware system environments is performed by the configuration module 52. The operation of partitioning each potential hardware system environment into the corresponding virtual machines is performed by the partitioning module 53. The operation of assigning priority weight factors to each of the specific resource demands is performed by the weight assignment module 54. The operation of computing a weighted sum of squares metric for each potential hardware system environment is performed by the computation module 55.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system adapted to determine hardware system environment for a given set of workloads comprising:

a memory within which is resident a specification which defines the functionality of each workload and a plurality of resource demands for each workload;

at least one processor configured to execute a plurality of threads; and program code executed by the at least one processor to define the functional specification, a plurality of hardware resource demands, and a plurality of performance objectives for each workload;

divide each workload into one or more functional logical partitions (FLPARS), each FLPAR having the plurality of software and hardware demands determined by its associated workload;

define a physical specification for the one or more FLPARS, the physical specification comprising one of high level software and hardware system restrictions and a predefined pool of hardware components;

configure a plurality of potential hardware system environments each comprising a group of hardware components selected from a predefined pool of hardware components, where each hardware component to provides a plurality of resource capacities, and each of the plurality of potential hardware system environments to provides specific resource capacities that at least satisfy the specific resource demands of the given set of workloads;

partition each of the potential hardware system environments into a plurality of virtual machine nodes where each of the virtual machine nodes corresponds to one of the FLPARS;

assign a plurality of priority weight factors, where each priority weight factor is assigned to a specific resource demand of a specific FLPAR;

compute weighted sum of squares metrics for the each of the potential hardware system environments as $$S = \sum_{i \in R} w_i \left( \frac{y_i - f(x_i)}{y_i} \right)^2$$

where each '$w_i$' is the priority weight factor for the corresponding FLPAR, each '$y_i$' is the specific resource capacity of the corresponding virtual machine, and each '$f(x_i)$' is the specific resource demand of the specific logical partition; and determine hardware system environment with a lowest weighted sum of squares metric.

2. The computer system of claim 1 where each of the FLPARS comprising a workload are further broken down into to precise demands selected from the set of precise demands consisting of: web server page request rates, database server transaction rates, memory size requirements, CPU processing speed, and network throughput bandwidth.

3. The computer system of claim 1 where the allocation of functionality from each workload to certain logical partitions is dynamically derived from a set of workload requirements and user's specifications.

4. The computer system of claim 1 where one of the potential hardware system environments comprises a single system that includes multiple CPUs.

5. The computer system of claim 1 where one of the potential hardware system environments is a heterogeneous hardware environment.

6. The computer system of claim 1 where one of the potential hardware system environments comprises multiple heterogeneous systems that are micropartitioned into a number of virtual machines.

7. The computer system of claim 1 wherein at least one of the software and hardware demands is selected from the set consisting of: CPU demands, memory demands, bandwidth demands, and I/O demands.

8. The computer system of claim 1 wherein the program code is further configured to restrict the predefined pool of hardware components based on user defined high-level restrictions on the desired optimal hardware system environment.

9. The computer system of claim 7 wherein at least one of the high-level software and hardware system restrictions is selected from the set consisting of: operating system, hardware vendor, hardware brand, and specific hardware model.

10. The computer system of claim 1 wherein the predefined pool of hardware components further comprises variants of certain hardware models, where each variant represents a potential CPU core configuration for a base hardware model.

11. The computer system of claim 9 wherein the predefined pool of hardware components further comprises additional variants of certain hardware models, where each additional variant represents a memory configuration based on CPU core configuration for a base hardware model.

12. The computer system of claim 1 where the predefined pool of hardware components comprises an online hardware catalog that can be updated in real-time by a participating hardware vendor.

13. A method for determining hardware system environment that executes a plurality of logical partitions (LPARS) for a given set of workloads comprising:

defining, by use of a processor, a functional specification defining the functionality of each workload, a plurality of hardware resource demands for each workload within a planned hardware system environment, and workload performance objectives for each workload;

dividing each workload into one or more functional logical partitions (FLPARS), each FLPAR having the plurality of hardware resource demands determined by a particular workload;

defining a physical specification for the one or more FLPARS, the physical specification comprising one of high level hardware system restrictions and a predefined pool of hardware components;

configuring a plurality of potential hardware system environments each comprising a group of hardware components selected from a predefined pool of hardware components, where each hardware component provides a plurality of resource capacities, and each of the plurality of potential hardware system environments provides specific resource capacities that at least satisfy the specific resource demands of the given set of workloads;

partitioning each of the potential hardware system environments into a plurality of virtual machine nodes where each of the virtual machine nodes corresponds to one of the FLPARS;

assigning a plurality of priority weight factors, where each priority weight factor is assigned to a specific resource demand of a specific FLPAR;

computing weighted sum of squares metrics for the each of the potential hardware system environments as $$S = \sum_{i \in R} w_i \left( \frac{y_i - f(x_i)}{y_i} \right)^2$$

where each '$w_i$' is the priority weight factor for the corresponding FLPAR, each '$y_i$' is the specific resource capacity of the corresponding virtual machine, and each '$f(x_i)$' is the specific resource demand of the specific logical partition; and determining a hardware system environment with a lowest weighted sum of squares metric.

14. The method of claim 13 where each of the FLPARS comprising a workload are further broken down into to precise demands selected from the set of precise demands consisting of: web server page request rates, database server transaction rates, memory size requirements, CPU processing speed, and network throughput bandwidth.

15. The method of claim 13 where the predefined pool of hardware components comprises an online hardware catalog that can be updated in real-time by a participating hardware vendor.

* * * * *